(12) United States Patent
Png et al.

(10) Patent No.: US 7,613,728 B2
(45) Date of Patent: Nov. 3, 2009

(54) METADATA DATABASE MANAGEMENT SYSTEM AND METHOD THEREFOR

(75) Inventors: Teck Hock Png, St Patrick's Garden (SG); Ka Theng Poh, Teck Road (SG); Wei-Jen Sng, Saraca Road (SG); Stephan Stadelmann, Rhu Cross (SG)

(73) Assignee: Reuters Limited (GB)

( * ) Notice: Subject to any disclaimer, the term of this patent is extended or adjusted under 35 U.S.C. 154(b) by 709 days.

(21) Appl. No.: 10/510,045

(22) PCT Filed: Feb. 24, 2003

(86) PCT No.: PCT/SG03/00036

§ 371 (c)(1),
(2), (4) Date: Oct. 1, 2004

(87) PCT Pub. No.: WO03/083724

PCT Pub. Date: Oct. 9, 2003

(65) Prior Publication Data

US 2006/0253495 A1    Nov. 9, 2006

(30) Foreign Application Priority Data

Apr. 2, 2002    (SG) ............................. 200201821

(51) Int. Cl.
*G06F 17/30*    (2006.01)
(52) U.S. Cl. ..................... 707/104.1; 707/1; 707/10; 707/101; 707/203
(58) Field of Classification Search .............. 707/1–10, 707/100–101, 104.1, 102, 200, 203; 709/223–224, 709/246
See application file for complete search history.

(56) References Cited

U.S. PATENT DOCUMENTS

| | | | | |
|---|---|---|---|---|
| 6,345,288 B1* | 2/2002 | Reed et al. | ................... | 709/201 |
| 6,564,263 B1* | 5/2003 | Bergman et al. | ............ | 709/231 |
| 7,162,427 B1* | 1/2007 | Myrick et al. | ................... | 705/1 |
| 2002/0049603 A1* | 4/2002 | Mehra et al. | ................... | 705/1 |
| 2002/0073236 A1* | 6/2002 | Helgeson et al. | ............ | 709/246 |
| 2003/0074358 A1* | 4/2003 | Sarbaz et al. | ................. | 707/10 |
| 2003/0126136 A1* | 7/2003 | Omoigui | ...................... | 707/10 |
| 2003/0229529 A1* | 12/2003 | Mui et al. | ....................... | 705/8 |
| 2005/0154699 A1* | 7/2005 | Lipkin et al. | ................... | 707/1 |
| 2008/0162498 A1* | 7/2008 | Omoigui | ...................... | 707/10 |

* cited by examiner

*Primary Examiner*—Wilson Lee
*Assistant Examiner*—Hanh B Thai
(74) *Attorney, Agent, or Firm*—Banner & Witcoff, Ltd.

(57) ABSTRACT

A metadata database management system (300), comprising a metadata database (305) and a knowledge manager (310), for dynamically coupling to a database system (315). The metadata database (305) provides a single knowledge repository for storing metadata assoicated with information sources (330), that provide information that is processed by inbound information processors (325) for storage in the database system (315); and metadata associated with information consumers (340), that provide information retrieved from the database system (315), and processed by the outbound information processors (335). The knowledge manager (310) is coupled to access the metadata database (305), and provides one or more metadata applications that selectively use the metadata in the metadata database (305) to manage a plurality of knowledge aspects of the database system (315), the information sources (325) and the information consumers (335).

38 Claims, 13 Drawing Sheets

METADATA DATABASE MANAGEMENT SYSTEM AND METHOD THEREFOR

FIELD OF THE INVENTION

The present invention relates to a metadata database management system, and more particularly to a metadata database management system for a database system that manages diverse incoming and outgoing data.

BACKGROUND OF THE INVENTION

Information service companies, also referred to as information service providers, provide information including financial data and news on a subscription basis to subscribers or information consumers. The information consumers are predominantly commercial entities, and the information provided includes records, such as company annual reports; company results announcements; company share prices; news items relating to particular companies; news items and market prices relating to market sectors (e.g. telecommunications, banking, or pharmaceuticals); commodity prices, and so on. Each record provides information on a specific subject and each record has a number of information fields. For example, a record that provides the stock information of a particular company can include information fields that provide the last transacted price on a particular day, the change in stock price relative to the previous day, the day's highest price, the day's lowest price, the opening price, the current bid and ask prices, the volume of stock traded, and a variety of other information.

The information service provider receives information from various information sources, and typically uses a database system that comprises several databases for storing the information from the various information sources. Dependent on which information source provides the information, and which information consumers the information is to be provided to, the received information from a particular data source may be stored in one or more of the databases. Similarly information to be provided to a particular information consumer may be retrieved from one or more databases.

An information service provider receives information directly from various information sources, which include reporters in the field; and indirectly, from a variety of third parties, including stock exchanges and data providers around the world. The information sources themselves may also be companies with their own information database systems, and such database systems are typically proprietary, and do not share common information platforms, language, formats, structure, classifications, distribution formats, taxonomy, etc., with the database system of the information service provider.

In addition, information service providers provide information to a variety of information consumers. Some of these information consumers, such as banks and financial institutions, use the information for their own business purposes. Other information consumers may value-add to the information by processing or repackaging the information, and then providing the resultant value-added information to their own information consumers. Some information consumers have their own database systems, and again, like the information sources, such database systems of the information consumers are typically proprietary, and do not share common information platforms, language, formats, structure, classifications, distribution formats, taxonomy, etc., with the database system of the information service provider.

Hence, a primary function of an information service provider is to convert raw data or data with low granularity to value added information or derived information, getting information from a variety of information sources and providing the information to a variety of information consumers, whereby the database systems of the information sources, the information service provider and the information consumers are not directly compatible.

Due to the variety of information sources, a specific inbound processor has to be configured to receive information from a particular information source, and process the information into a form that is compatible with the database system of the information service provider, before the information from the particular information source can be stored by, and made available to, the information service provider. As a result the information service provider requires a variety of inbound processors for processing information from a variety of information sources.

Similarly, when information is to be provided to a particular information consumer, a specific outbound processor has to be developed to retrieve predetermined information stored by the information service provider, process the retrieved information into a form that is usable by the particular information consumer, and then provide the processed information to the particular information consumer. Again, as a result, the information service provider requires a variety of outbound processors for processing information for the variety of information consumers.

FIG. 1 shows an information service provider 100, in accordance with the prior art, that receives information from various information sources 105, stores the information in databases 115A-115C, and provides information from the databases 115A-115C to various information consumers 110. A particular inbound processor 120A is coupled between each of the information sources 105 and the databases 115A-115C, and the particular inbound processor 120A is designed to receive information from predetermined one or more of the information sources 105, and to store the received information in the databases 115A-115C in accordance with a predetermined arrangement.

Similarly, a particular outbound processor 125A is coupled between the databases 115A-115C and each of the information consumers 110, and the particular outbound processor 125A is designed to retrieve predetermined records from the databases 115A-115C, and provide the predetermined records to the particular information consumer 110A.

In the past, the information service provider relied on many different database systems 115A-115C, with multiple and varied database structures, coupled together to store the information. Consequently organization of the stored information was difficult, which made storing and retrieving information complicated. The inbound and outbound processors 120 and 125 were created as and when there was a need from particular information sources 105 and from particular information consumers 110. As these inbound and outbound processors 120 and 125 are created on an adhoc basis, there was a tendency for records in the database system 115A-115C, and even the inbound and outbound processors 120 and 125, to be duplicated.

An improved database system for an information service provider is disclosed in pending Singapore patent application no. 200100230-2 by Stadelmann et al., titled "Method and Apparatus for a Financial Database Structure", and assigned to the same assignee, Reuters Limited of the United Kingdom, as the present patent application. The Stadelmann et al. patent application is incorporated herein by reference thereto.

Stadelmann et al. teaches a database system comprising a single data repository that allows the complexity and changes to the single data repository, the inbound processors 120, and the outbound processors 125, to be managed. Thus, avoiding duplication of data and resources, and the inefficiencies of the prior art database system.

FIG. 2 shows an information service provider 200, in accordance with the Stadelmann patent application, that utilizes the improved database system 215, that provides a single data repository. As before, inbound processors 220 receive, process and store information from the information sources 105 in the database system 215, and outbound processes 225 retrieve, process and provide information from the database system 215 to the information consumers 110.

Typically, the inbound and outbound processors 220 and 225 comprise tailor made or customized software programs that are developed on an adhoc basis. Typically, the software programs are developed when the information service provider contracts to work with a new information source or a new information consumer, and to meet new requirements of existing information sources or consumers. A disadvantage of the adhoc nature of the development and implementation of the customized software programs is that documented details and records are typically scarce, unstructured, fragmented. In some instances such information may not be available in consolidated form at one location, and where available, may not be easily accessible. Indeed, even when available, the documented details and records may be outdated, and may provide insufficient details to be useful. Consequently, knowledge that relates to the database system, the information sources and the information consumers, as may be captured in the documented details and records, is not managed, and various knowledge aspects that may be derived from such knowledge is not available.

A further disadvantage due to the lack of documented details and records, is the difficulty in maintaining such customized software programs, and training others to use and maintain such customized software programs. Hence, the need for knowledge aspects for maintenance and training.

Yet a further disadvantage is the difficulty of making changes and tracking the changes that may be required to the various customized software programs and the database system from time to time. Any changes need to be managed, controlled and tracked, and these requirements can be compounded when a single change requires multiple related changes to be effected. In addition, various versions of software programs may be employed, and these versions should be controlled to avoid incompatibility. Still another disadvantage due to the lack of documented details and records is the inability to view, organize, and change the relationships between data stored in the database systems of the information sources, the database system and the information consumers. Hence, managing changes is another knowledge aspect that is required.

A still further disadvantage is the tendency for redundancy to occur when each of the customized software programs is developed and put into operation. For example, standard processes for storing and retrieving information in the database system may be duplicated for a variety of inbound and outbound information processors; or common standards for some of the information relating to currency, units, language, geographical units, symbols etc. may be duplicated. This results in inefficient customized software programs and inefficient use of resources, which increases the complexity of maintaining the various customized software programs and the database system. Thus, managing resources is a further knowledge aspect that is required.

Hence, there is a need to store and maintain information about the database system, the inbound processors and the outbound processors in a knowledge repository. There is also a need to provide a means that can be used to determine various knowledge aspects of the database system, inbound processors and the outbound processors, from the information in the knowledge repository.

BRIEF SUMMARY OF THE INVENTION

The present invention seeks to provide a metadata database system and method therefor which overcomes, or significantly reduces, the abovementioned problems of the prior art.

Accordingly, in one aspect, the present invention provides a metadata database management system for at least one database, wherein the at least one database is coupled to receive information from at least one information source and coupled to provide information to at least one information consumer, the metadata database management system comprising:

a metadata database for storing metadata associated with data stored in the at least one database, for storing metadata associated with the at least one information source, and for storing metadata associated with the at least one information consumer; and a knowledge manager coupled to the metadata database, the knowledge manager comprising at least one metadata application for managing a plurality of knowledge aspects of the at least one database, the at least one metadata application for accessing at least some of the metadata stored in the metadata database, and the at least one metadata application for using the at least some of the metadata to manage at least one of the plurality of knowledge aspects of the at least one database.

In another aspect the present invention provides a metadata database for a metadata database management system of at least one database, wherein the at least one database is coupled to receive information from at least one information source and coupled to provide information to at least one information consumer, the metadata database comprising:

a metadata repository for storing metadata associated with data stored in the at least one database, for storing metadata associated with the at least one information source, and for storing metadata associated with the at least one information consumer.

In yet another aspect the present invention provides a knowledge manager for a metadata database management system of at least one database, wherein the at least one database is coupled to receive information from at least one information source and coupled to provide information to at least one information consumer, the knowledge manager comprising:

at least one metadata application for coupling to a metadata database, the at least one metadata application for managing a plurality of knowledge aspects of the at least one database, the at least one metadata application for accessing at least some of the metadata stored in the metadata database, and the at least one metadata application for using the at least some of the metadata to manage at least one of the plurality of knowledge aspects of the at least one database.

BRIEF DESCRIPTION OF THE DRAWINGS

An embodiment of the present invention will now be described, by way of example, with reference to the drawings of which.

DETAIL DESCRIPTION OF THE DRAWINGS

The present invention provides a metadata database management system for dynamically coupling to a database system, where the metadata database management system comprises a metadata database and a knowledge manager. The metadata database provides a single knowledge repository for storing metadata associated with data stored in the database system, metadata associated with information sources that provide information for storage in the database system, and metadata associated with information consumers that provide information retrieved from the database system.

The knowledge manager is coupled to access the metadata database, and provides a plurality of metadata applications that selectively use the metadata in the metadata database to manage a plurality of knowledge aspects of the database system, the information sources and the information consumers.

Thus, the metadata database management system in accordance with the present invention, as will be described, stores and maintains knowledge of the database system, the inbound processors and the outbound processors, and uses the stored knowledge to manage the database system, the inbound processors and the outbound processors.

Figure 1:
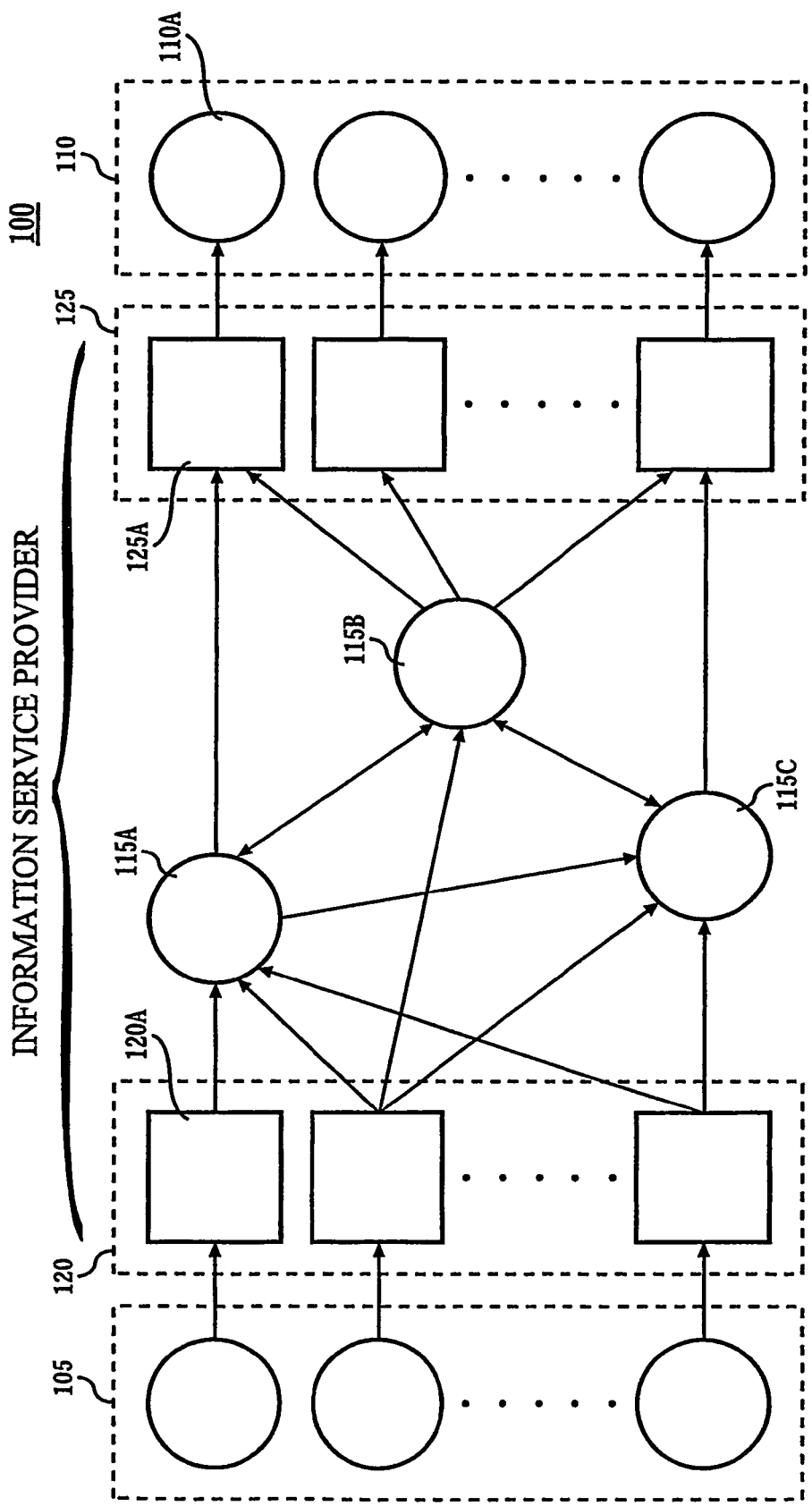
FIG. 1 shows a functional block diagram of an information service provider in accordance with the prior art.
Figure 2:
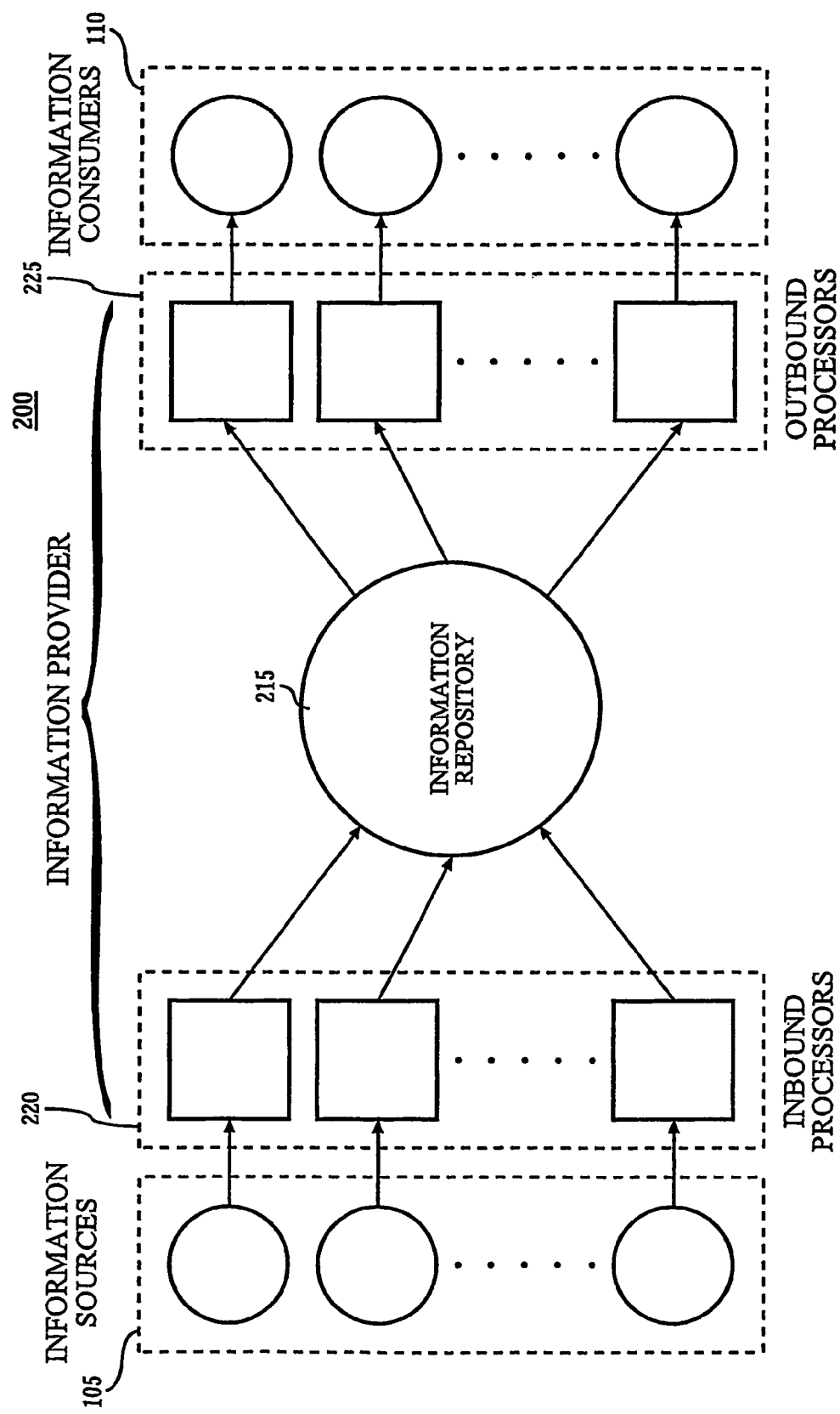
FIG. 2 shows a functional block diagram of an information service provider also in accordance with the prior art.
Figure 3:
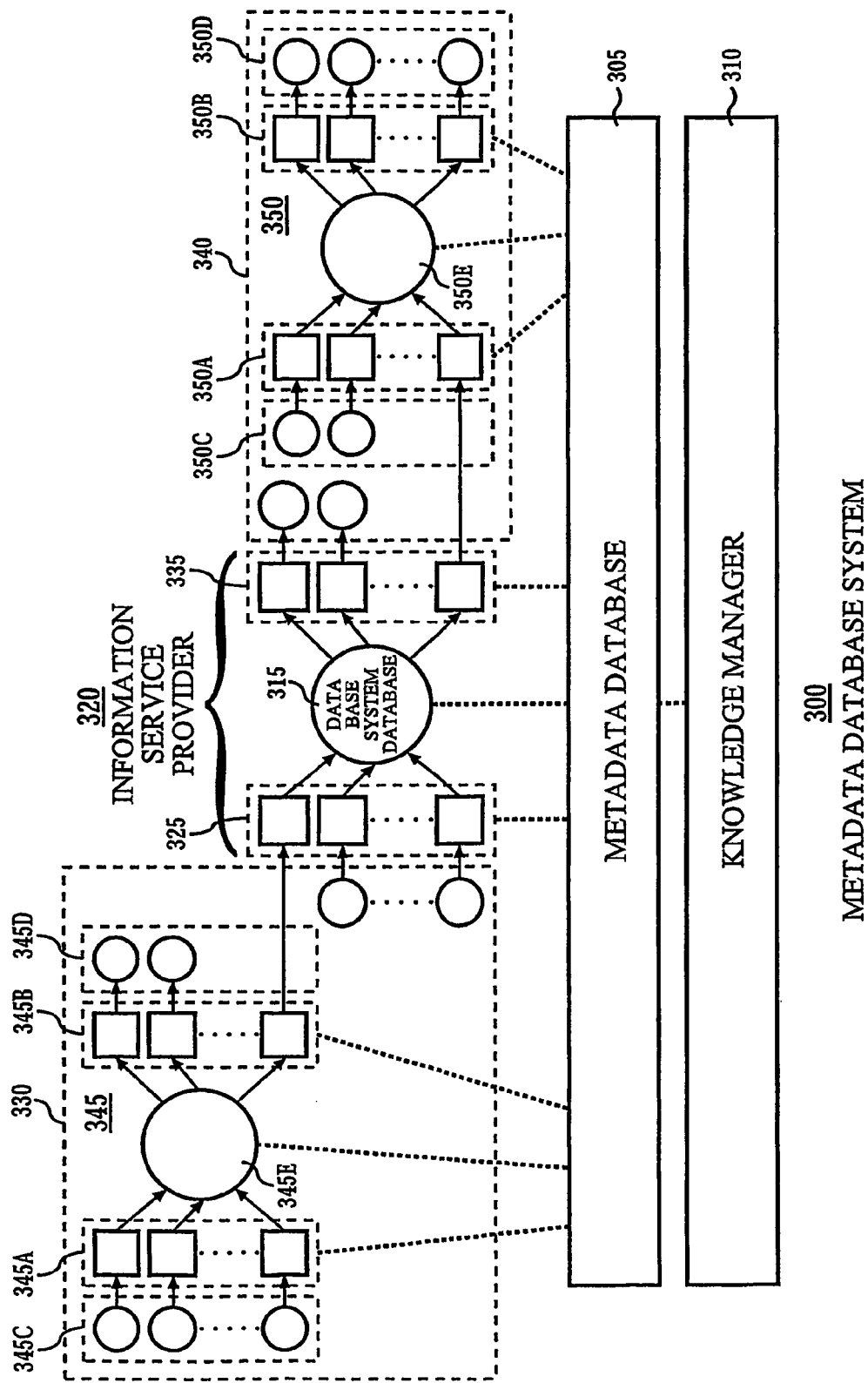
FIG. 3 shows a functional block diagram of a metadata database management system, in accordance with the present invention, operably coupled to the information service provider in FIG. 2.

FIG. 3 shows a metadata database management system 300 comprising a metadata database 305 and knowledge manager 310. The metadata database 305 is a metadata repository, which stores metadata that supports the knowledge manager 310, and the metadata database 305 is dynamically coupled to a database system 315 of an information service provider 320.

The information service provider 320 includes inbound information processors 325, that process information from information sources 330 and stores the processed information in the database system 315. The information service provider 320 also includes outbound information processors 335, that process information retrieved from the database system 315, and provides the processed information to information consumers 340.

The information sources 330 include another information service provider 345, and the information consumers 340 include yet another information service provider 350. Each of the information service providers 345 and 350 have inbound 345A and 350A and outbound 345B and 350B information processors coupled thereto, respectively. And each of the inbound information processors 345A and 350A are coupled to information sources 345C and 350C, respectively. Similarly, each of the outbound information processors 345B and 350B are coupled to information consumers 345D and 350D, respectively. Finally, each of the information service providers 345 and 350 have a database system 345E and 350E, respectively, that are coupled to the respective inbound 345A and 350A and outbound 345B and 350B processors.

It will be appreciated by one skilled in the art that while the information sources 330 include the information service provider 345, there may be many other information service providers that function as information sources for the information service provider 320. Further, the information service provider 345 may have yet another information service provider (not shown) function as one of its information sources. Likewise, while the information consumers 340 include the information service provider 350, there may be other information service providers that perform the function of information consumers for the information service provider 320. Further, the information service consumer 350 may have yet another information service provider (not shown) function as one of its information consumers.

The metadata database 305 is coupled to each of the database systems 315, 345E and 350E, the inbound processors 325, 345A and 350A, and the outbound information processors 335, 345B and 350B; and the metadata database 305 stores metadata associated with each of the information service providers 320, 345 and 350, including information about data in the database systems 315, 345E and 350E, information about the inbound processors 325, 345A and 350A, and information about the outbound information processors 335, 345B and 350B.

The knowledge manager 310 comprises a variety of applications that support various knowledge aspects of the database systems 315, 345E and 350E, the inbound processors 325, 345A and 350A, and the outbound information processors 335, 345B and 350B, by accessing predetermined metadata stored in the metadata database 305

Figure 4:
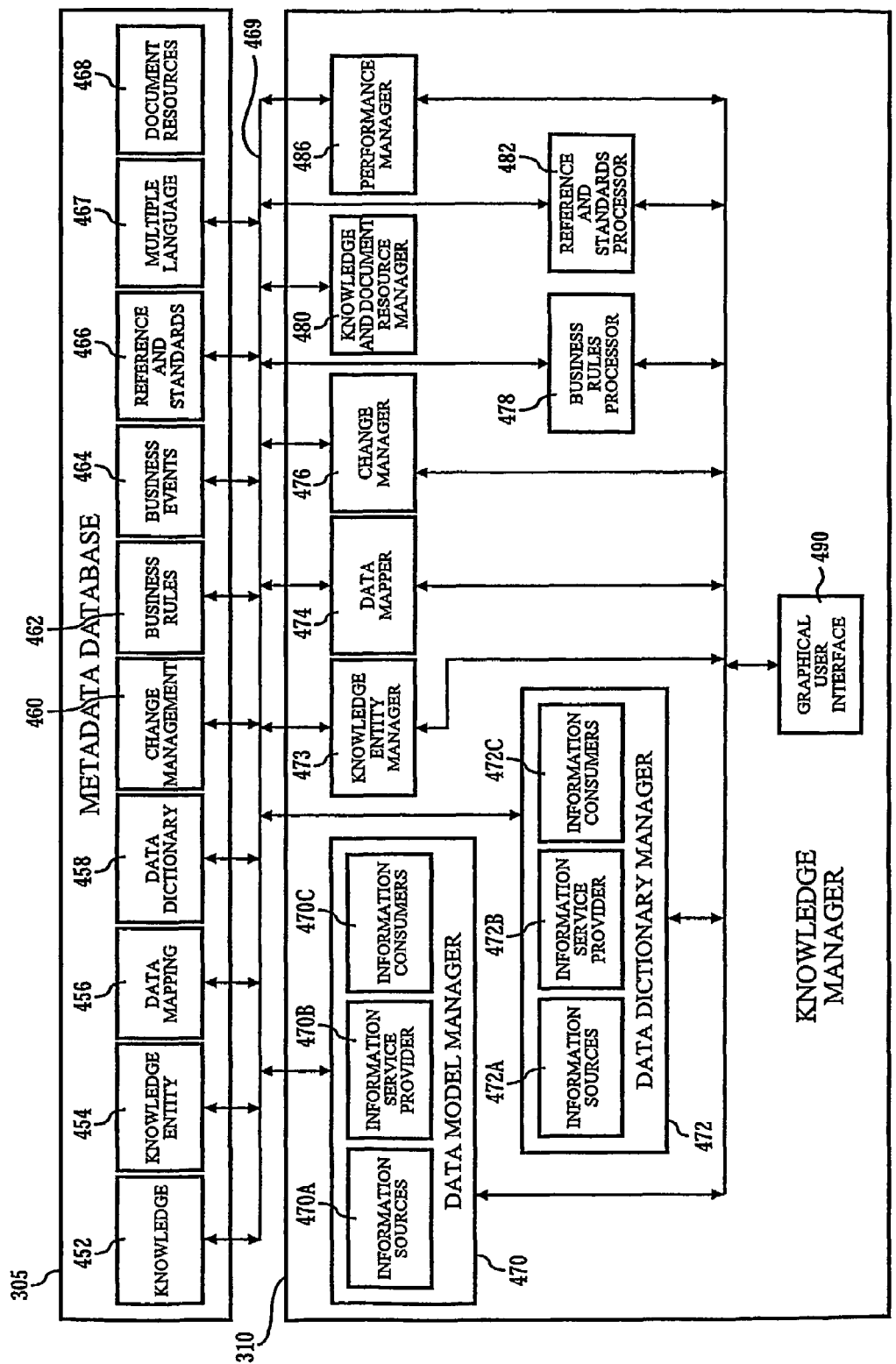
FIG. 4 shows a more detailed functional block diagram of the metadata database in FIG. 3 with it constituent components.

With additional reference now to FIG. 4, the metadata database 305 and the knowledge manager 310 comprise a variety of portions 452-468 and applications 470-486, respectively. The variety of portions 452-468 and applications 470-486 are integrated by being inter-coupled, as represented by a common information bus 469 that links the variety of portions 452-468 and applications 470-486. Hence, the applications 470-486 can access any of the portions 452-468 of the metadata database 305.

The metadata database 305 comprises several portions, which include a knowledge portion 452, a knowledge entity portion 454, a data-mapping portion 456, a data dictionary portion 458, a change management portion 460, a business rules portion 462, a business events portion 464, a reference and standards portion 466, a multiple language portion 467, and a document resources portion 468.

The metadata in one or more of these portions 452-466 may be accessed by each of the variety of applications 470-486 of the knowledge manager 310. Also, the metadata database 305 is extensible and additional metadata can be added to support extensions when, for example, information on new service providers are added. Also, when new applications are added to the knowledge manager 310, the extensible metadata database 305 will allow the metadata to support the new applications to be stored therein. In one embodiment, a relational database management system was used to create the metadata database 305.

The metadata in the metadata database 305 is organized in entities, which typically consist of one or more attributes. In addition, each entity may consist of one or more unique identifiers, such as a primary key and a unique key. Each attribute may have one and only one domain. Further, each domain may have one or more domain values. The domain is a constraint or set of allowable values that an attribute may have. Each of the portions 452-468 of the metadata comprises predetermined collections of entities, attributes and domains.

Figure 6A:
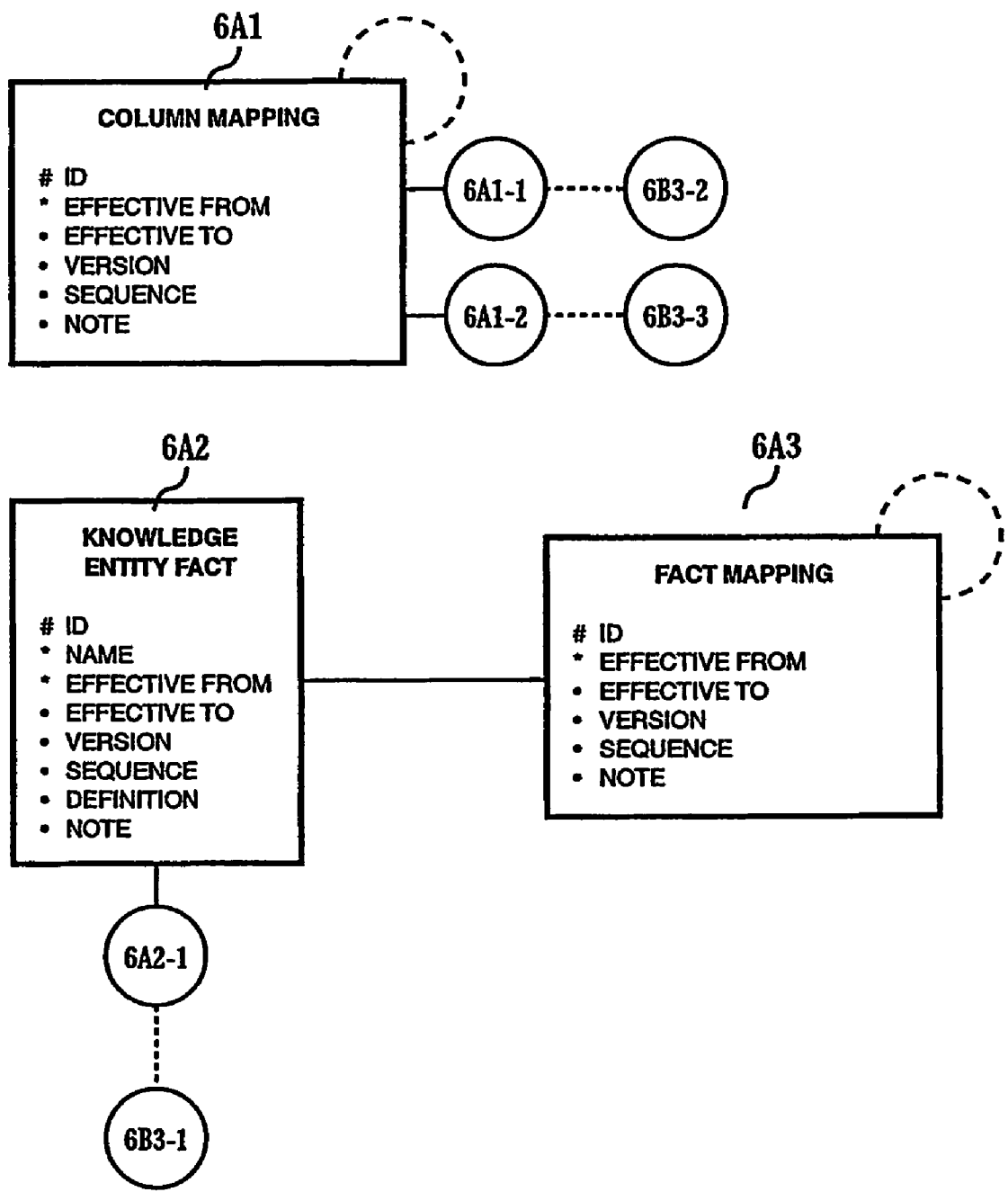
FIGS. 6A-6G is an entity relationship diagram of the metadata in the metadata database in FIG. 3.
Figure 6B:
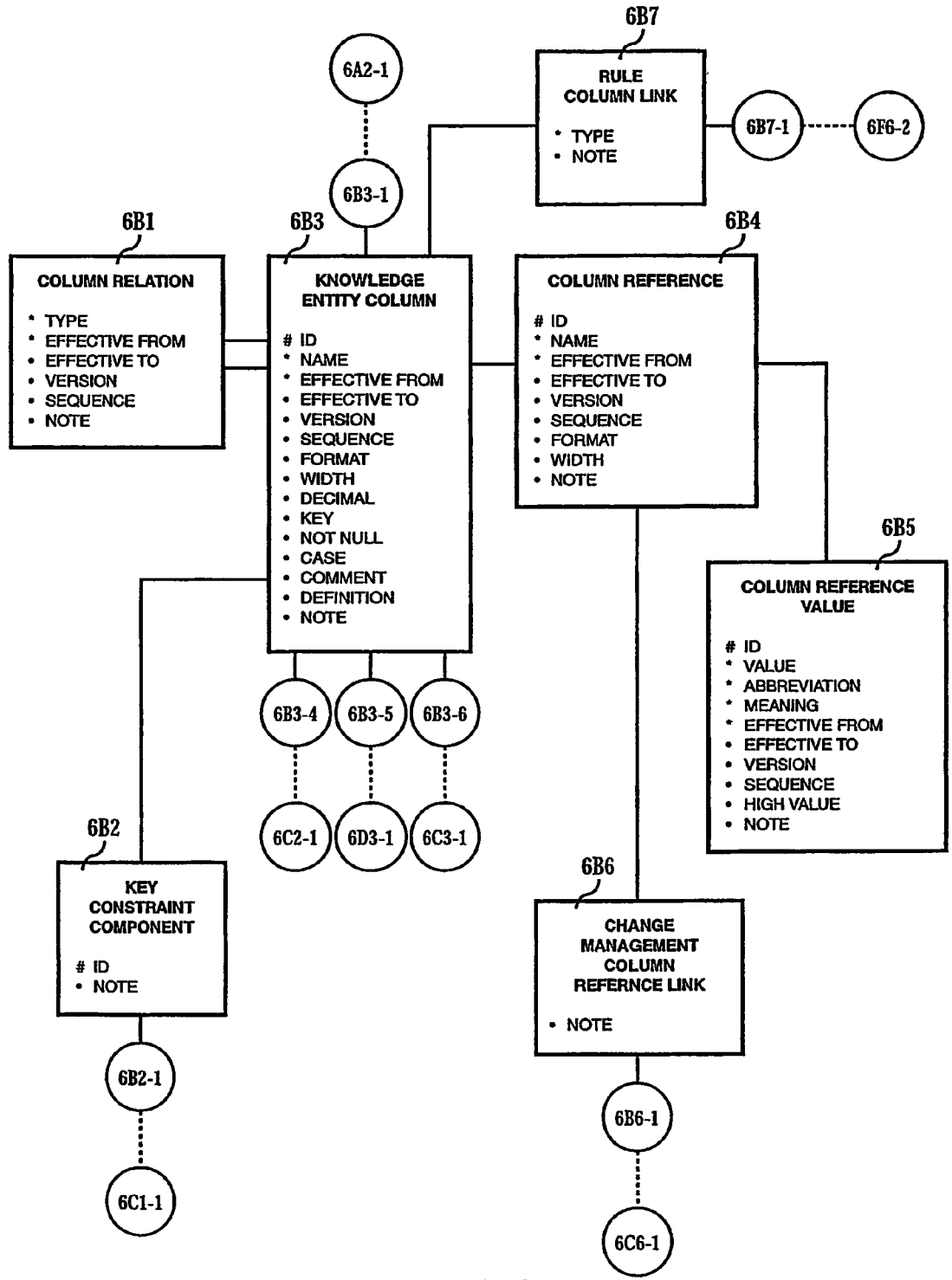
Figure 6C:
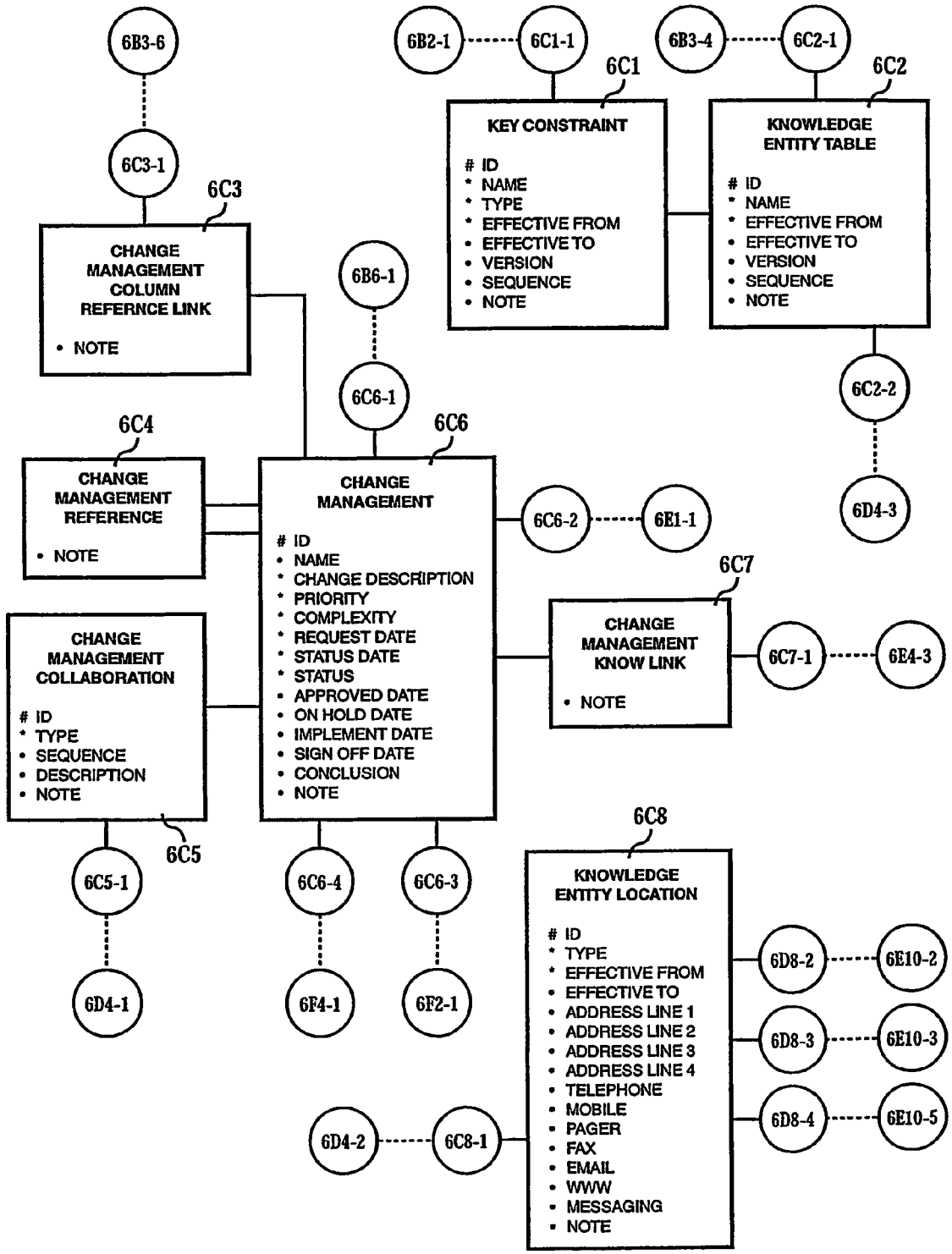
Figure 6D:
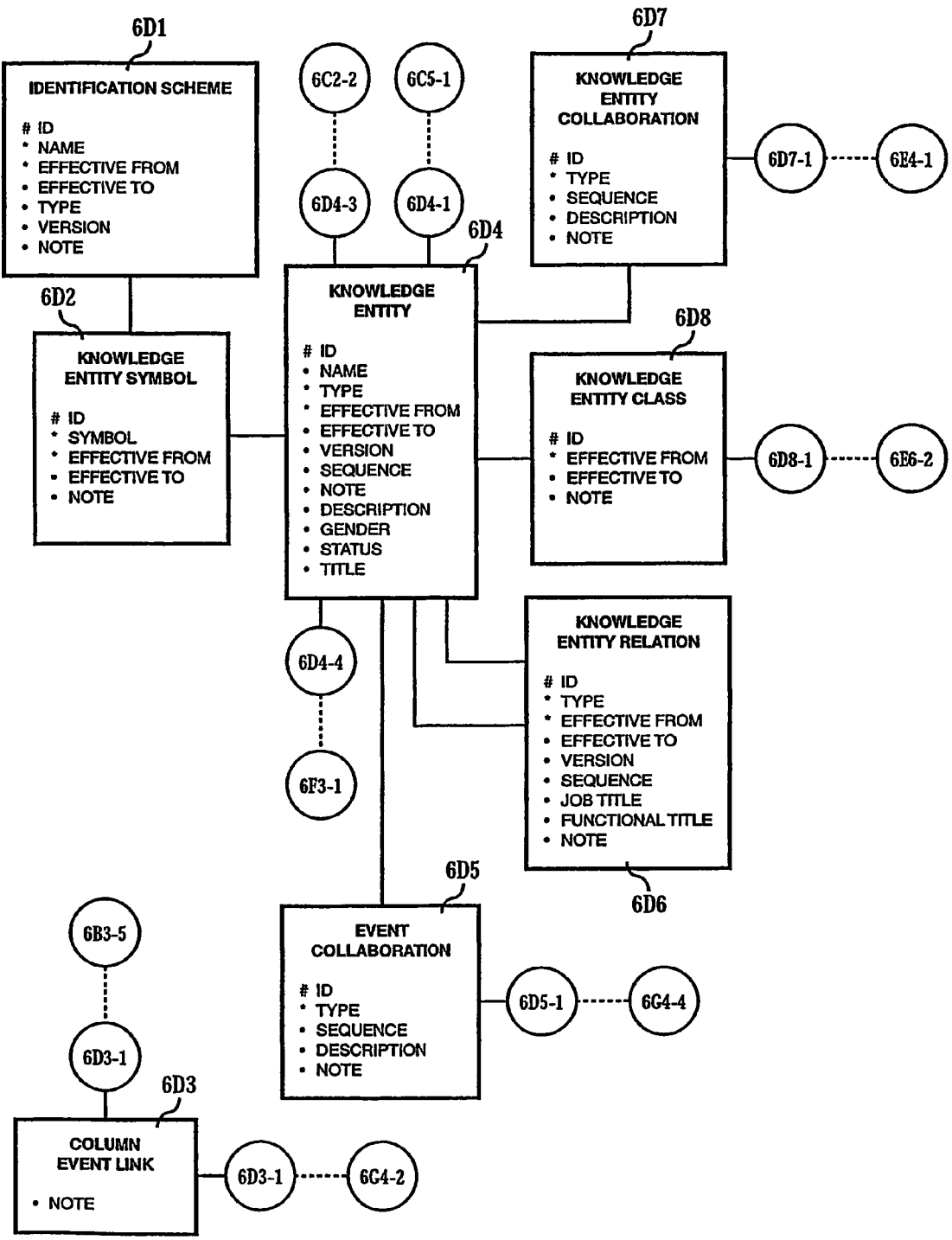
Figure 6E:
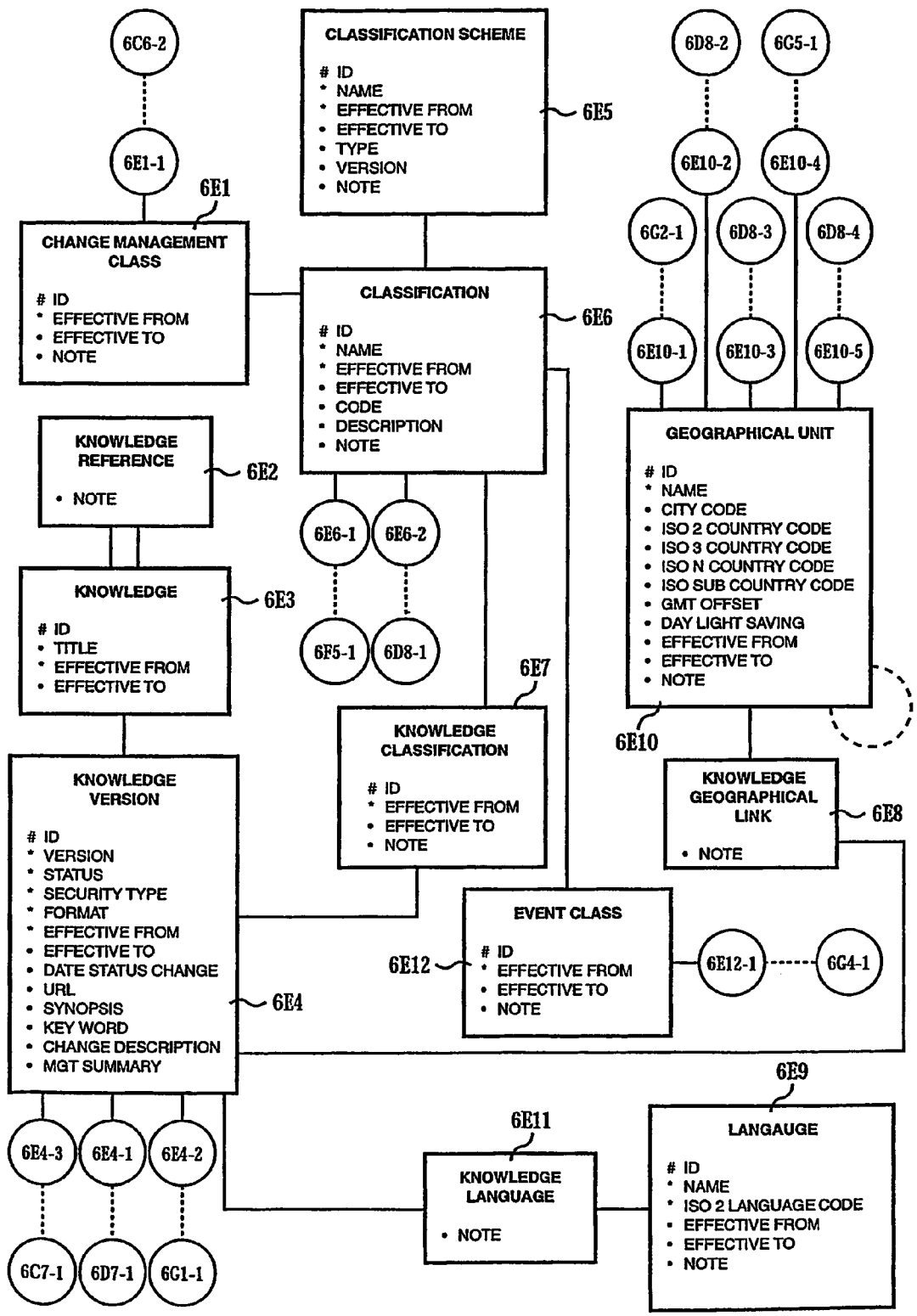

The knowledge portion 452 provides information that relates to knowledge entities such as, knowledge about experience, ideas, business intelligence, intellectual assets, profiles, programs, procedures, processes, best practices, lessons learnt, education, and information or location relating to knowledge entities. The primary entities in a portion of an ER diagram that constitutes the knowledge portion 452 of the metadata database 305 are shown in FIG. 6E, which along with FIGS. 6A-6D and 6F to 6G, will have entities thereshown described later. ER diagrams are entity relationship diagrams, which will be known to one skilled in the art.

The knowledge entity portion 454 provides information on knowledge entities, such as organizations units and systems. For example, organization units include company, department, functional group, project, and a person; and systems can include applications, tools, and database systems. Each knowledge entity may be associated with one or more knowledge entities. The relationships of the knowledge entities are stored in a hierarchical structure. The knowledge entity portion 454 when associated with the knowledge portion 452 forms the expertise, for example, of managing document change and supports collaboration between the different portions. In addition, each knowledge entity can collaborate knowledge in many metadata portions, such as documents, business rules, business events and change management. For example, each knowledge entity can perform one or more collaboration roles, such as publisher, sponsor, trainer, author, contributor, editor, translator, reviewer, requester, tester, and administrator. These knowledge entities form the foundation of organization of metadata in the metadata database 305. The primary entities in a portion of an ER diagram, that constitute the knowledge entity portion 452 of the metadata database 305, are shown in FIG. 6D.

The data mapping portion 456 provides information on the multi-dimensional mapping between information received from the information sources 330 and stored in the database system 315, and the information retrieved from the database system 315, and provided to the information consumers 340, seamlessly. This mapping information describes back-end data extraction and transformation processes used to prepare data, and the data mapping across the information sources 330, the information service provider 315 and the information consumers 340, facilitates data heritage analysis that traces how and where data originates, is transformed, mapped, manipulated, derived or aggregated. In addition, the mapping information defines the information sources' and information consumers' database systems 345E and 350E, supplier and/or feed structure, and format in detail. The primary entities in a portion of an ER diagram, that constitutes the data-mapping portion 456 of the metadata database 305, are shown in FIG. 6A.

The data dictionary portion 458 provides information of logical and physical data models, and information, which describes what type of information is stored, and how that information is organized in the structure of the metadata database 305. The data dictionary metadata also includes properties and characteristics for data tables and columns, such as data type, uniqueness, optionality, referential integrity, and data values held in a particular domain. The primary entities in a portion of an ER diagram, that constitute the data dictionary portion 458 of the metadata database, 305 are shown in FIG. 6B.

The change management portion 460 provides information on changes across metadata portion of the metadata database 305, such as, data models, applications, documentation, business rules, the data mapping, etc. The change management portion 460 archives all information related to changes, including what was changed, why it was changed, where it was affected, when the change took place, who made the change, and how the change was carried out. The primary entities in a portion of an ER diagram, that constitute the change management portion 460 of the metadata database 305, are shown in FIG. 6C.

Figure 6F:
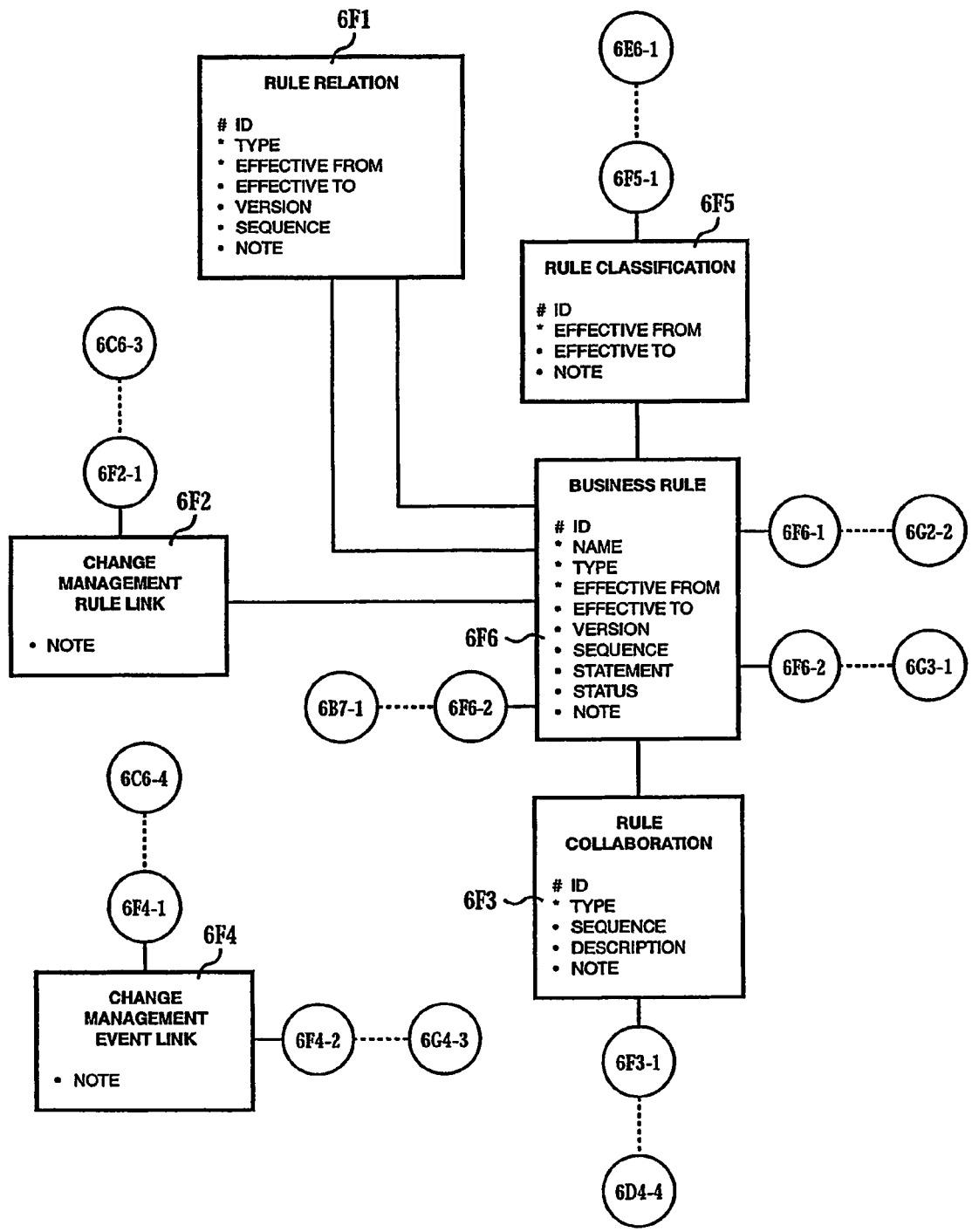

The business rules portion 462 provides information on business rules, which are statements that impose some form of constraints on multiple levels, such as data elements, corporate guidelines, etc. For example, data elements are governed by field specifications and table relationships, according to the way an organization perceives and uses the data. This perception is based on how an organization functions and runs its business. The types of business rules include both database-oriented and application-oriented rules. The database-oriented rules that are stored in the business rules portion 462 of the metadata database 305, comprise a set of constraints that have been implemented in the data model of the database system 315. The business rules include term, fact, action and inference rules, and covers the data validation (update) rules, data derivation rules, exception rules, constraints in the database system 315 table and column, and data restriction, constraint, and process logic. The primary entities in a portion of an ER diagram, that constitute the business rules portion 462 of the metadata database 305, are shown in FIG. 6F.

Figure 6G:
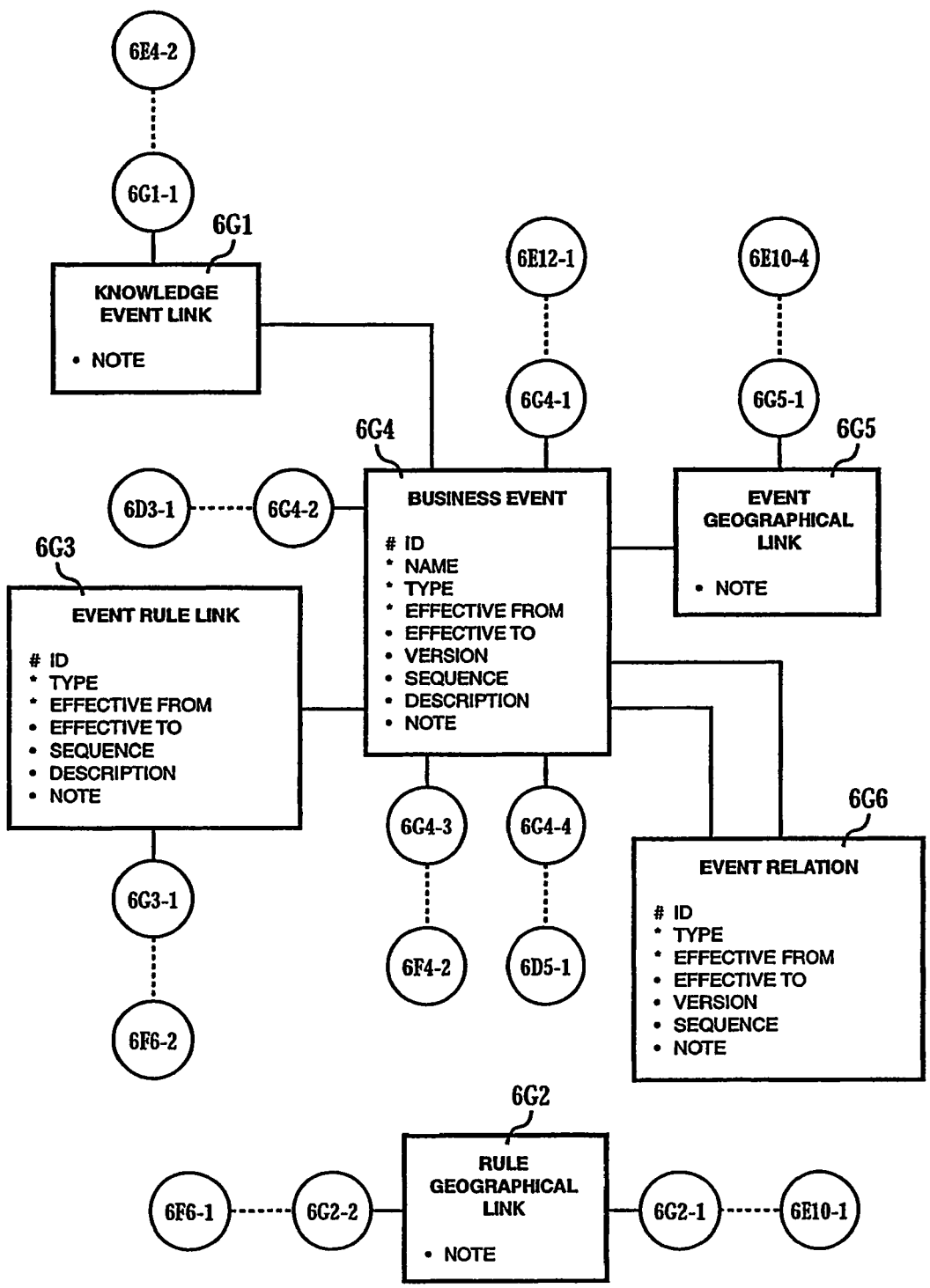

The business events portion 464 provides information on business events, which are events that affect or relate to the knowledge entity at different levels, such as employee share option schemes and corporate restructuring. It includes events which are within the business scope of the knowledge entity. The primary entities in a portion of an ER diagram, that constitute the business events portion 462 of the metadata database 305, are shown in FIG. 6G.

The reference and standards portion 466 provides information on reference and standards taxonomies that are used by the database system 315 for standardization, administration and reporting. The reference and standards portion 466 comprises taxonomies such as, identification schemes, reference schemes, and classification schemes. The reference and standards portion is inherent in the other portions of the metadata database 305, and may be coupled to any of the variety of applications 470-486. The multiple language portion 467 of the metadata database 305 provides storage of all textual metadata, simultaneously, in many different languages that apply to all metadata portions 452-468 in the metadata database 305. The languages that are supported by the multiple language portion 467, include traditional Chinese, simplified Chinese, Japanese Kanji, and Thai local language. As an example, the Language entity 6E9 and a multi-language linking entity (not shown) in FIG. 6E provide multiple language support for the Knowledge Version entity 6E4. The Language entity 6E9 is also linked to other entities that have multiple language support, however, these linking entities are not shown. The Language entity 6E9 is a primary entity in an ER diagram, that constitute the multiple language portion 467 of the metadata database 305.

The document resources portion 468 provides information on document resources that are stored and available in the database system 315. The document resources include version data, version change history, multiple document history and related/reference documents. In addition, document semantic content is stored. These include title, subject category (pre-defined), status, key words, language, and a summary page.

Turning now to the knowledge manager 310, the applications supported by the knowledge manager 310 include a data model manager 470, a data dictionary manager 472, a knowledge entity manager 473, a data mapper 474, a change manager 476, a business rules manager 478, a knowledge and document resource manager 480, a reference and standards processor 482, a performance manger 486, and a GUI 490.

The data model manager 470 comprises an information sources portion 470A for providing a data model of the database system 345E of the information service provider 345, which is one of the information sources 330 of the information service provider 320. Also, an information service provider portion 470B of the data model manager 415 provides a data model of the database systems 315 of the information service provider 320. Further, an information consumer portion 470C of the data model manager 470 provides a data model of the database system 350E of the information service provider 350, which is one of the information consumers 340 of the information service provider 320.

The data model manager 470 accesses data model metadata primarily stored in the knowledge, knowledge entity and data dictionary portions 452, 454 and 458 of the metadata database 305. The data model manager 470 then uses the data dictionary metadata to relate to the data models, and presents the data models to users in a graphical form. The data models comprise diagrams, an example being ER diagrams.

The data dictionary manager 472 includes an information sources portion 472A for providing data dictionaries of the information sources 330. These data dictionaries include a data dictionary for the database system 345E of the information service provider 345. An information service provider portion 472B of the data dictionary manager 472 provides a data dictionary for the database system 315 of the information service provider 320. The data dictionary manager 472 also includes an information consumers portion 472C for providing data dictionaries of the information consumers 340, which includes a data dictionary of the database system 350E of the information service provider 350.

The data dictionary manager 472 accesses data dictionary metadata primarily stored in the knowledge, knowledge entity and data dictionary portions 452, 454 and 458 of the metadata database 305. The data dictionary manager 472 then uses the data dictionary metadata to generate data dictionaries, and provides the necessary output to the GUI 490, for the data dictionaries to be presented to a user.

The knowledge entity manager 473 accesses metadata primarily stored in the knowledge entity portion 454 of the metadata database 305. The knowledge entity manager 473 then uses the knowledge entity metadata to structure the relationships of each knowledge entity. The knowledge entity manager 473 provides the necessary information to the data model manager 470, the data dictionary manager 472, the change manager 476, the knowledge and document resource manager 480, the performance manager 486, the business rules processor 478, and so on.

The data models provided by the data model manager 470, illustrate relationships between entities and attributes in the database systems 315, 345E and 350E graphically, while the data dictionaries set out the relationships between entities and attributes in the database systems 315, 345E and 350E in text form.

In an embodiment of the present invention, a user using the data model manager 470 and the data dictionary manager 472, via the GUI 490, is able to search the data dictionaries, and navigate to the respective graphical ER diagram of the respective data model. Similarly, each entity and attribute in the ER diagram of a data model, is linked to the respective entity in a data dictionary. When a data dictionary is accessed, other metadata relating to the knowledge entity manager 473, the change manager 476, the data mapper 474, the business rule manager 478 are linked.

The data mapper 474 accesses data mapping metadata, which is primarily stored in the data mapping portion 456 of the metadata database 305, and enables a user to browse and search for data mapping in different ways—information source 330 data centric, information service provider 320 centric, or information consumer 340 data centric. Data heritage and lineage analysis can be performed to provide information on the original source of the data, the destination and usage of data in the information consumer databases. The ability to analyze and understand the origin of the data is necessary to prevent data incompatibility by comparing the data format, length and width across the information sources 330, the information service provider 320, and the information consumers 340.

The change manager 476 accesses change management metadata, which is primarily stored in the change management portion 460 of the metadata database 305, and enables users and administrators to identify and track the areas that may have an impact when a change is to be made. This is sometimes referred to as impact analysis. The change manager supports online change request form, through which any change 476 request can be submitted and processed. Apart from identifying and monitoring the areas that may be impacted when a change request is to be assessed, the change manager 476 facilitates the tracking of change requests throughout their life cycle, and archives all information related thereto in the change management portion 460 of the metadata database 305. The change manager 476 records and manages what was changed, why it was changed, where it was affected, when the change took place, who made the change, and how the change was carried out. The change manager 476 manages changes in the database structure of the database system 315, the GUI 490, documentation, data mapping, business rules, reference and standards, report template, etc. The change manager provides a focal point, whereby change requests are raised, analyzed, evaluated and tracked.

The business rules processor 478 accesses business rules metadata, which is primarily stored in the business rules portion 462 of the metadata database 305, and as mentioned before, the types of business rules include both database-oriented and application-oriented rules. The database-oriented rules were described earlier in relation to the business rules portion 462. The application-oriented rules are implemented by the business rules processor 478, and include data checks that need to be considered in exception reports, front-end application and data feed processor. The business rules processor 478 enables business rules to be stored, administered and managed.

The reference and standards processor 482, access reference and standards metadata, which is primarily stored in the reference and standards portion 466 of the metadata database 305. The reference and standards processor 482 implements the reference and standards that are used in the metadata database 305 for standardization, administration and reporting purposes. This allows customized reports to be generated and published for easy access, search and reference.

The performance manager 486 accesses all the metadata portions 452-468 of the metadata database 305. The performance manager 486, processes statistics such as metadata access, usage patterns, and metadata inventory. For example, statistics on who view what and when, the number of documents that were collaborated by the knowledge entities, etc.

The knowledge and document resource manager 480 accesses knowledge metadata and document resources metadata, which are primarily stored in the document resources portion 468 and the knowledge portion 452 of the metadata database 305. The knowledge and document resource manager 480 facilitates purposeful and effective searching of documents, which is easily accessible and there are multiple ways to find documents with intuitive search methods. The knowledge and document resource manager 480 controls the versions of documents, the change history of documents, and provides access to multiple document history and related/reference documents. The document resources metadata is leveraged and linked dynamically to the other portions of the metadata database 305, such as the change management portion 460 to track changes to documents.

The GUI 490 provides a user interface to the knowledge manager 310, and accesses metadata stored in the metadata database 305. The GUI 490 enables authorized users or administrators to access, manage, and administer the metadata stored in the metadata database 305.

Figure 5:
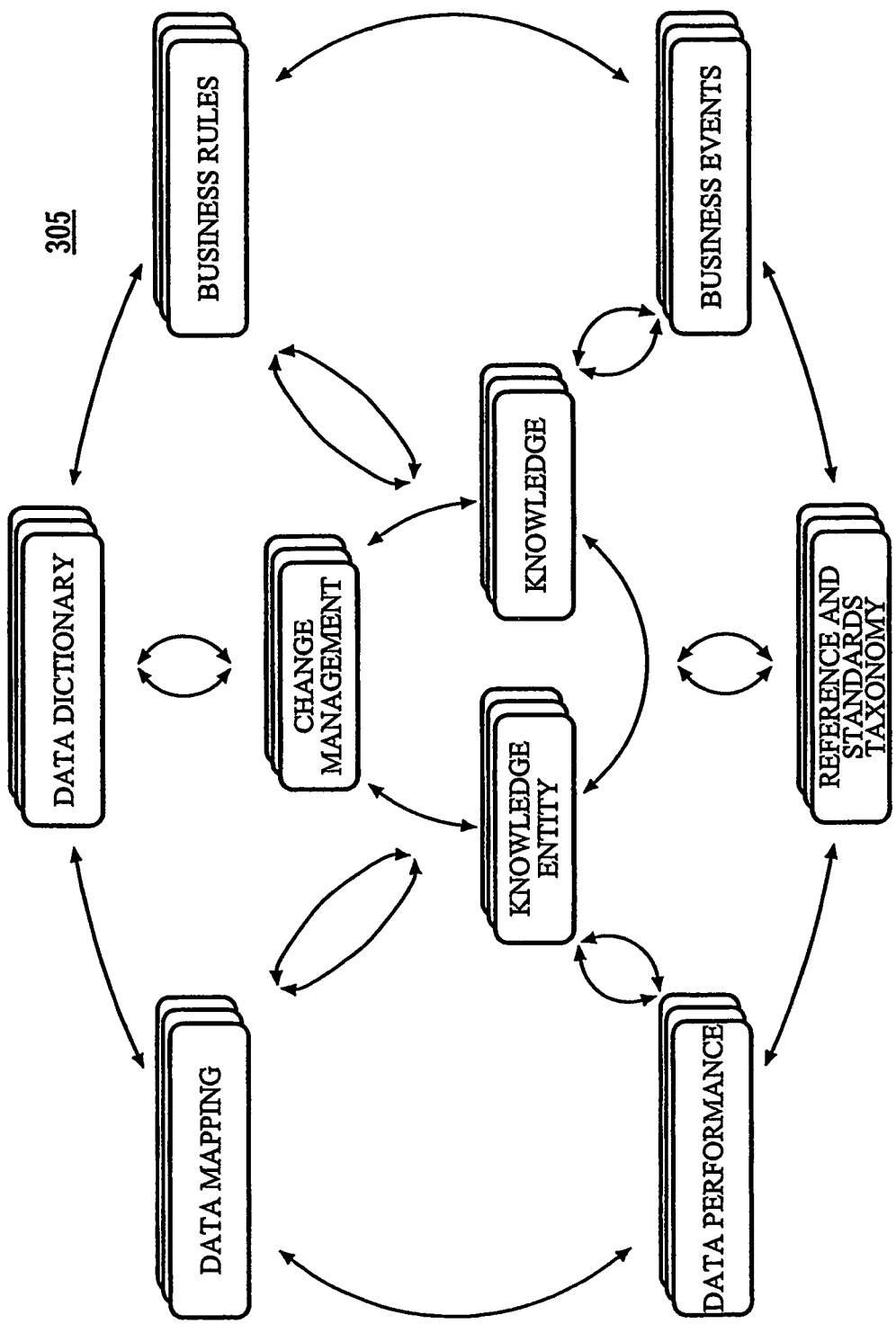
FIG. 5 shows a functional block diagram of the metadata database in FIG. 3 indicating the flow of information between various metadata portions.

FIG. 5 illustrates that the various metadata portions 452-468 in the metadata database 305 are integrated and interact seamlessly to exchange information during operation, as represented by the arrows.

FIGS. 6A-6G extend over several pages, and a brief explanation on the organization of the figures and the references that are used in these figures follows. Using FIG. 6A as an example, the reference FIG. 6A refers to the page with FIG. 6A, and the COLUMN MAPPING entity on that page has a reference 6A1. Now looking at the coupling points, for example, the one labeled 6A1-1 - - - 6B3-2, refers to entity reference 6A1, coupling point number 1, being coupled to entity reference 6B3, coupling point number 2. The same labeling scheme is used through out FIGS. 6A-6G.

Figure 7:
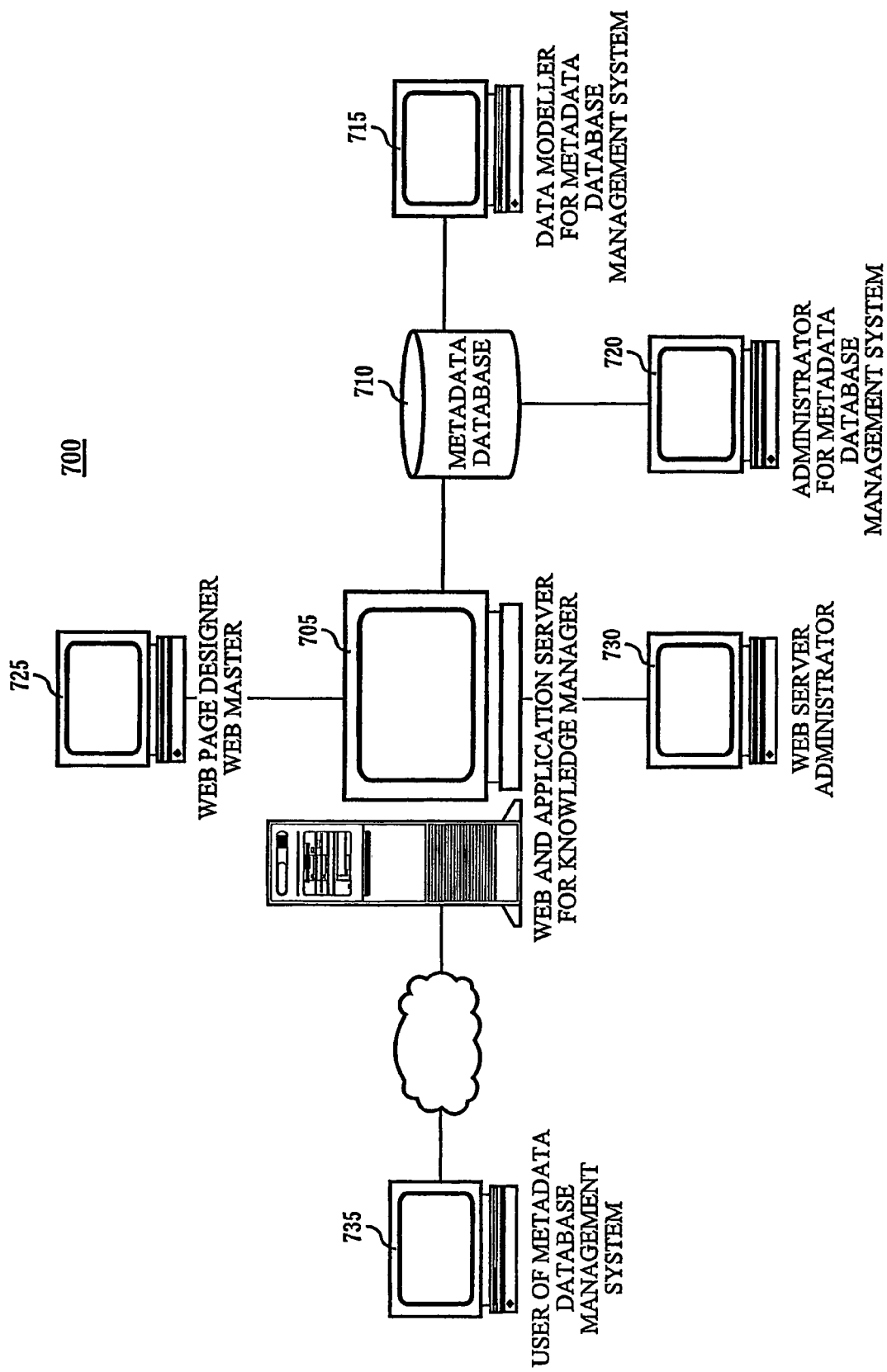
FIG. 7 shows a schematic of a computer system for implementing the metadata database management system.

In FIG. 7 a computer system 700 for implementing the metadata database management system 300 of the present invention, includes Web and Application servers 705, which support a knowledge manager, and is coupled to a metadata database 710. The metadata database is in turn coupled to a data modeler terminal 715 and an administrator terminal 720. The Web and Application servers 705 are coupled to a terminal 725 for web page design and for web master administration, a web server administrator terminal 730, and terminals 735 (only one shown) for users.

Hence, the metadata database management system in accordance with the present invention, as described, provide a metadata database that stores and maintains information about data stored in a database system. In addition, a knowledge manager uses the metadata stored in the metadata database to determine various knowledge aspects of the database system.

This is accomplished by storing metadata associated with data that is stored in a database system, in a metadata database. The metadata database may be divided into portions, where each portion includes predetermined metadata. A knowledge manager provides a variety of application for determining a variety of knowledge aspects of the database system. Each of the applications accesses one or more of the portions of the metadata database, and determine a knowledge aspect of the database system. The various knowledge aspects that are determined advantageously allow the database system to be more efficiently managed.

When the database system is coupled to information sources and information consumers, the metadata of the information sources and information consumers, and the database system stored in the metadata database are coupled. The knowledge manager can then determine a variety of knowledge aspects of the database system including the flow of data with the information sources and information consumers.

The present invention, as described, therefore provides a metadata database management system and method therefor which overcomes, or significantly reduces, the abovementioned problems of the prior art because diverse incoming and outgoing data can now be managed with reduced redundancy and rework.

It will be appreciated that although only one particular embodiment of the invention has been described in detail, various modifications and improvements can be made by a person skilled in the art, without departing from the scope of the present invention.

The invention claimed is:

1. A computer system configured to manage a metadata database and at least one information database,
    wherein the at least one information database is configured to receive information from at least one information source and configured to provide information to at least one information consumer, and
    wherein the metadata database stores metadata associated with data stored in the at least one information database, stores metadata associated with the at least one information source, and stores metadata associated with the at least one information consumer, and
    wherein the computer system includes a knowledge manager in communication with the metadata database and comprises a plurality of metadata applications for managing a plurality of knowledge aspects of the at least one information database, for accessing at least some of the metadata stored in the metadata database, and for using the at least some of the metadata to manage at least one of a plurality of knowledge aspects of the at least one information database, the plurality of metadata applications comprising:
    a data model manager using the at least some of the metadata to manage at least one data model of the at least one information database and presenting the at least one data model in graphical form;
    a data dictionary manager using the at least some of the metadata to generate and manage at least one data dictionary of the at least one information database, wherein the data dictionary manager accesses metadata stored in a knowledge entity and a data dictionary portion of the metadata database;
    a knowledge entity manager using the at least some of the metadata to manage at least one knowledge entity of the at least one information database and using the at least some of the metadata to structure a relationship of the at least one knowledge entity;
    a data mapper using the at least some of the metadata to manage at least one data mapping of the at least one information database based on one of an information source, an information source provider, and an information consumer; and
    a change manager using the at least some of the metadata to manage at least one change associated with the at least one information database, wherein the change manager accesses metadata stored in a change management portion of the metadata database, wherein one or more of the data model manager, the data dictionary manager, the knowledge entity manager, the data mapper, and the change manager are stored on an application server.

2. The computer system in accordance with claim 1 being dynamically coupled to the at least one information database.

3. The computer system in accordance with claim 1 being dynamically coupled to the plurality of information sources.

4. A The computer system in accordance with claim 1 being dynamically coupled to the plurality of information consumers.

5. A The computer system in accordance with claim 1, wherein the at least one information source comprises at least another information database, the computer system is configured to couple to the at least another information database, and the metadata database is for storing metadata associated with the at least another information database.

6. A The computer system in accordance with claim 5, wherein the at least another information database has at least another one information source coupled thereto, the computer system is configured to couple to the at least another one information source, and the metadata database is for storing metadata associated with the at least another one information source.

7. A The computer system in accordance with claim 5, wherein the at least another information database has at least another one information consumer coupled thereto, the computer system is configured to couple to the at least another one information consumer, and the metadata database stores metadata associated with the at least another one information consumer.

8. The computer system in accordance with claim 1, wherein the at least one information consumer comprises at least one other information database, the computer system is configured to couple to the at least one other information database, and the metadata database stores metadata associated with the at least one other information database.

9. The computer system in accordance with claim 8, wherein the at least one other information database is coupled to at least one other information source, the computer system is configured to couple to the at least one other information source, and the metadata database stores metadata associated with the at least one other information source.

10. The computer system in accordance with claim 8, wherein the at least one other information database is coupled to at least one other information consumer, the computer system is configured to couple to the at least one other information consumer, and the metadata database is for storing metadata associated with the at least one other information consumer.

11. The computer system in accordance with claim 1, wherein the at least some of the metadata stored in the metadata database constitute a knowledge portion of the metadata database, and wherein the at least some of the metadata comprises at least one knowledge metadata.

12. The computer system in accordance with claim 1, wherein the at least some of the metadata stored in the metadata database constitute a knowledge entity portion of the metadata database, and wherein the at least some of the metadata comprises at least one knowledge entity metadata.

13. The computer system in accordance with claim 1, wherein the at least some of the metadata stored in the metadata database constitute a data mapping portion of the metadata database, and wherein the at least some of the metadata comprises at least one data mapping metadata.

14. The computer system in accordance with claim 1, wherein the at least some of the metadata stored in the metadata database constitute a data dictionary portion of the metadata database, and wherein the at least some of the metadata comprises at least one data dictionary metadata.

15. The computer system in accordance with claim 1, wherein the at least some of the metadata stored in the metadata database constitute a change management portion of the metadata database, and wherein the at least some of the metadata comprises at least one change management metadata.

16. The computer system in accordance with claim 1, wherein the at least some of the metadata stored in the metadata database constitute a business rules portion of the metadata database, and wherein the at least some of the metadata comprises at least one business rules metadata.

17. The computer system in accordance with claim 1, wherein the at least some of the metadata stored in the metadata database constitute a business event portion of the metadata database, and wherein the at least some of the metadata comprises at least one business event metadata.

18. The computer system in accordance with claim 1, wherein the at least some of the metadata stored in the metadata database constitute a reference and standards portion of the metadata database, and wherein the at least some of the metadata comprises at least one reference and standards metadata.

19. The computer system in accordance with claim 1, wherein the at least some of the metadata stored in the metadata database constitute a multiple language portion of the metadata database, and wherein the at least some of the metadata comprises at least one multiple language metadata.

20. The computer system in accordance with claim 1, wherein the at least some of the metadata stored in the metadata database constitute a document resources portion of the metadata database, and wherein the at least some of the metadata comprises at least one document resources metadata.

21. The computer system in accordance with claim 1, wherein the metadata applications further comprise a business rules processor using the at least some of the metadata to manage at least one business rule associated with the at least one information database.

22. The computer system in accordance with claim 1, wherein the metadata applications further comprise a reference and standards processor using the at least some of the metadata to manage at least one reference of the at least one information database.

23. The computer system in accordance with claim 22, wherein the at least one reference comprises at least one standard.

24. The computer system in accordance with claim 1, wherein the metadata applications further comprise a performance manager using the at least some of the metadata to manage at least one performance aspect of the at least one information database.

25. The computer system in accordance with claim 1, wherein the metadata applications further comprise a graphical user interface using the at least some of the metadata to manage at least one graphical user interface aspect of the at least one information database.

26. A computer system configured to manage a metadata database, the metadata database in communication with at least one information database and configured to receive information from at least one information source and to provide information to at least one information consumer, the metadata database comprising:
a metadata repository stored in an application server for storing metadata associated with data stored in the at least one information database, for storing metadata associated with the at least one information source, and for storing metadata associated with the at least one information consumer, the metadata repository comprising:

a knowledge portion providing information relating to knowledge entities and at least some of the metadata comprises at least one knowledge metadata;

a knowledge entity portion providing information on an organization of the knowledge entities and at least some of the metadata comprises at least one knowledge entity metadata;

a data mapping portion providing information on a multi-dimensional mapping between information received and stored and at least some of the metadata comprises at least one data mapping metadata;

a data dictionary portion providing information that describes what type of information is stored and at least some of the metadata comprises at least one data dictionary metadata; and a change management portion providing information on changes within the metadata repository and wherein at least some of the metadata comprises at least one change management metadata.

27. The metadata database in accordance with claim 26 further comprising a business rules portion of the metadata repository, and at least some of the metadata comprises at least one business rules metadata.

28. The metadata database in accordance with claim 26 further comprising a business event portion the metadata repository, and at least some of the metadata comprises at least one business event metadata.

29. The metadata database in accordance with claim 26 further comprising a reference and standards portion of the metadata repository, and at least some of the metadata comprises at least one reference and standards metadata.

30. The metadata database in accordance with claim 26 further comprising a multiple language portion of the metadata repository, and at least some of the metadata comprises at least one multiple language metadata.

31. The metadata database in accordance with claim 26 further comprising a document resources portion of the metadata repository, and at least some of the metadata comprises at least one document resources metadata.

32. A computer system including a knowledge manager for a metadata database management system of at least one information database, wherein the at least one information database is configured to receive information from at least one information source and configured to provide information to at least one information consumer, and wherein the knowledge manager includes a plurality of metadata applications in communication with a metadata database, for managing a plurality of knowledge aspects of the at least one information database, for accessing at least some of the metadata stored in the metadata database, and for using the at least some of the metadata to manage at least one of the plurality of knowledge aspects of the at least one information database, the plurality of metadata applications comprising:

a data model manager using the at least some of the metadata to manage at least one data model of the at least one information database and presenting the at least one data model in graphical form;

a dictionary manager using the at least some of the metadata to generate and manage at least one data dictionary of the at least one information database, wherein the data dictionary manager accesses metadata stored in a knowledge entity and a data dictionary portion of the metadata database;

a data mapper using the at least some of the metadata to manage at least one data mapping of the at least one information database based on one of an information source, and information source provider, and an information consumer;

a change manager using the at least some of the metadata to manage at least one change associated with the at least one information database, wherein the change manager accesses metadata stored in a change management portion of the metadata database, wherein at least one of the data model manager, the dictionary manager, the data mapper, and the change mapper are stored on an application server.

33. The knowledge manager in accordance with claim 32, the plurality of metadata applications further comprising a knowledge entity manager using the at least some of the metadata to manage at least one knowledge entity of the at least one information database.

34. The knowledge manager in accordance with claim 32, the plurality of metadata applications further comprising a business rules processor for using the at least some of the metadata to manage at least one business rule associate with the at least one information database.

35. The knowledge manager in accordance with claim 32, the plurality of metadata applications further comprising a reference and standards processor using the at least some of the metadata to manage at least one reference of the at least one information database.

36. The knowledge manager in accordance with claim 35, wherein the at least one reference comprises at least one standard.

37. The knowledge manager in accordance with claim 32, the plurality of metadata applications further comprising a performance manager using the at least some of the metadata to manage at least one performance aspect of the at least one information database.

38. The knowledge manager in accordance with claim 32, the plurality of metadata applications further comprising at least one graphical user interface using the at least some of the metadata to manage at least one graphical user interface aspect of the at least one information database.

* * * * *